Figure 1:
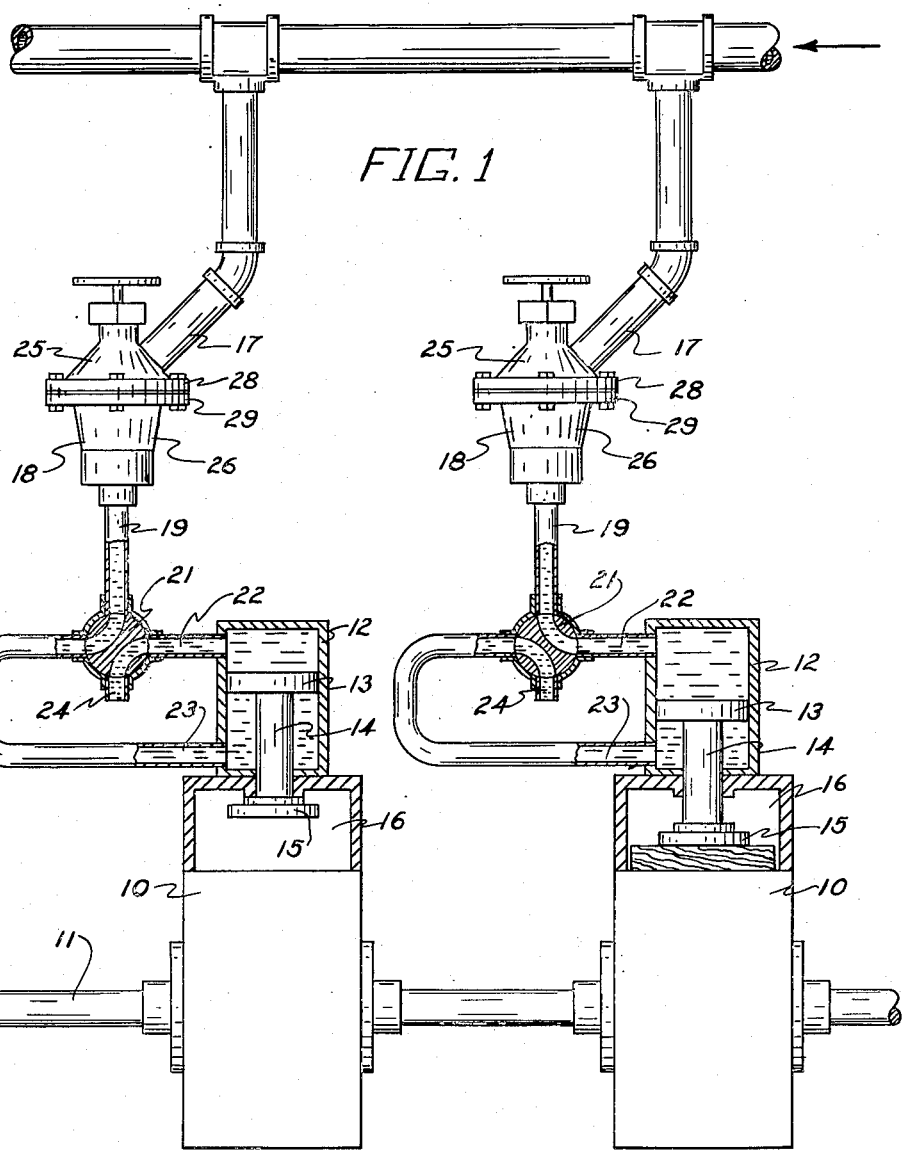

Sept. 16, 1952      A. F. MEYER      2,610,648
VALVE APPARATUS

Filed June 1, 1948      2 SHEETS—SHEET 2

INVENTOR
ADOLPH F. MEYER
BY G. H. Braddock
ATTORNEY

Patented Sept. 16, 1952

2,610,648

UNITED STATES PATENT OFFICE 2,610,648

VALVE APPARATUS

Adolph F. Meyer, St. Paul, Minn.

Application June 1, 1948, Serial No. 30,359

4 Claims. (Cl. 137—497)

This invention has relation to a valve apparatus.

An object of the invention is to provide a new and improved valve apparatus, for controlling and regulating the flow of a liquid, such as water, by way of a first pipe connection from a source of supply under pressure of the liquid and through the valve apparatus and a second pipe connection to a location, or locations, of use for said liquid, which will incorporate instrumentalities including a compound action differential pressure valve constructed to be capable of controlling and regulating flow of the liquid from said first pipe connection to said second pipe connection in such manner as to create reduced differential in pressure of liquid between the source and outlet sides of said valve apparatus in response to increased flow of liquid past said compound action differential pressure valve sufficient in magnitude to compensate for friction loss due to said increased flow; and, conversely, to create enlarged differential in pressure of liquid between said source and outlet sides of the valve apparatus in response to decreased flow of liquid past the compound action differential pressure valve sufficient in magnitude to compensate for friction gain due to said decreased flow; thus to be capable of maintaining a substantially constant differential in pressure of liquid between the source and outlet sides of said valve apparatus throughout a wide range of variation in the amount of flow of liquid past said compound action differential pressure valve.

A further object is to provide a valve apparatus, equipped to maintain a substantially constant differential in pressure of liquid between its source and outlet sides over a wide range of variation in the amount of flow of liquid from time to time through said valve apparatus, wherein will be incorporated desirable and improved features and characteristics novel both as individual entities of the valve apparatus and in combination with each other.

And a further object is to provide a valve apparatus of construction and operative in the manner as hereinafter set forth.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible as long as within the spirit of the invention and the scope of the claims which follow.

Figure 2:
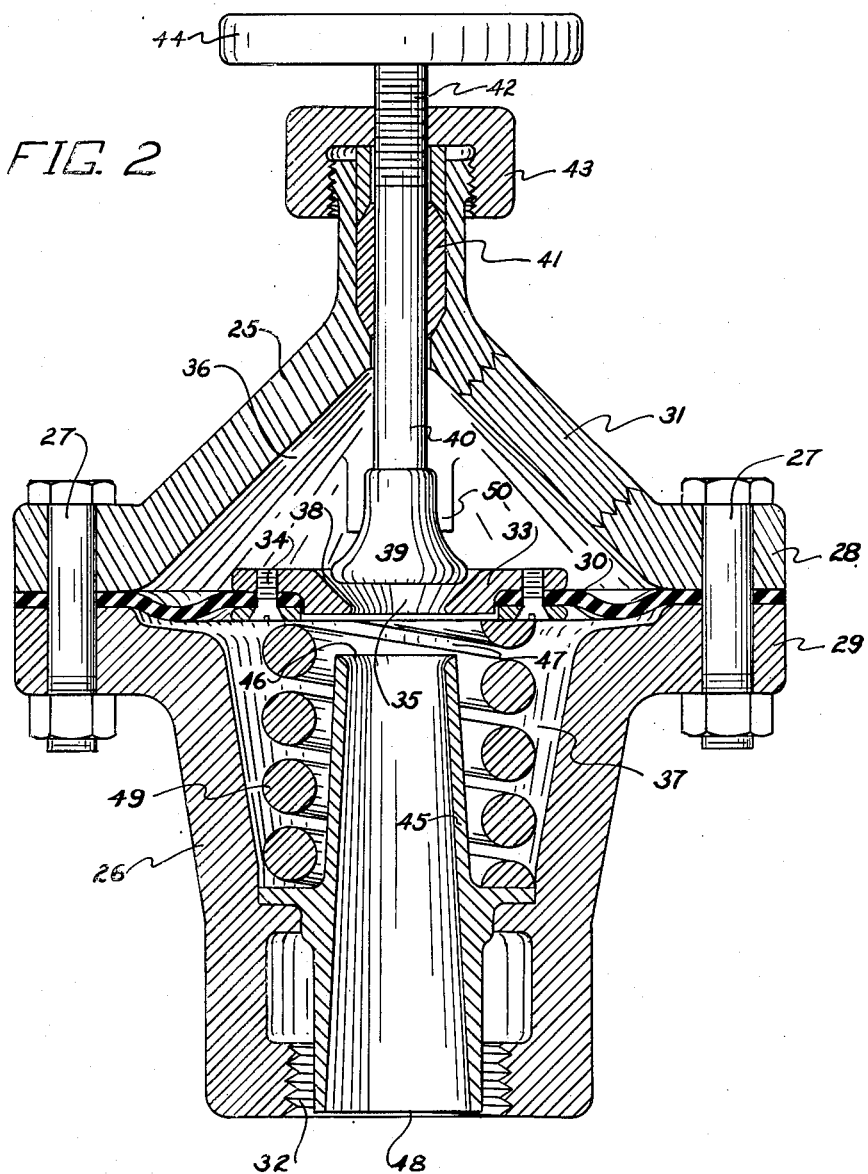

In the accompanying drawings forming a part of this specification,

Fig. 1 is an elevational view of valve apparatuses made according to the invention as when applied to one of various uses for which they can be employed; and Fig. 2 is an enlarged central longitudinal sectional view of either of the valve apparatuses of Fig. 1.

Although the valve apparatus which the invention presents can be employed for many different purposes, it is herein disclosed as when applied to use in the pulp grinding industry wherein a plurality of grindstones are usually mounted upon and rotated by a driven shaft and pistons movable in a cylinder are provided to press wood placed in pockets against the faces of the grindstones. Each piston is rigid with a foot by means of which the wood is pressed against the grindstone faces. Water under pressure is employed for the purpose of pressing the wood blocks in the pockets against the grinders by means of the pistons and also to remove said pistons away from the grinders in order that the pockets may be refilled with blocks of wood.

Referring to Fig. 1 of the drawings, numeral 10 denotes grindstones each of which is fast upon a shaft 11 adapted to be driven in any suitable and convenient manner. Each of a plurality of cylinders 12 is mounted adjacent the peripheral surface of a grindstone 10 and has therein a piston 13 mounted on a rod 14. The end of each rod 14 opposite the corresponding piston carries a foot 15 operating in a pocket 16 to press blocks of wood against the surface of a grindstone 10 so that the wood will be ground into pulp.

An inlet pipe connection leading from a source of supply of water under pressure opens to first pipe connections 17, 17 for supplying water under pressure to the cylinders 12. Each of the first pipe connections 17 opens to a valve apparatus 18 incorporating the features and characteristics of the present invention, and a second pipe connection 19 leads from each valve apparatus to a cylinder 12. Customarily, flow of water into the first pipe connections 17 from the source will be controlled, by valve mechanisms forming no part of the invention, so that the pressure of water in said first pipe connections will vary to controlled extent. Each of the second pipe connections 19 supplies the water under pressure in accordance with usual practice to a cylinder 12 and is provided with a two-way valve 21 which is manually operable to divert the water under pressure to one side of the corresponding piston while permitting the escape of water on the other side of said corresponding piston, or vice versa. In the position shown at the right in Fig. 1, the right two-way valve 21 is turned to permit water under pressure to travel through the corresponding pipe connection 19 and a port 22 to the upper face of the corresponding piston 13 by which means this piston is gradually forced inwardly to maintain the wood in engagement with the grindstone. This movement may be termed the normal movement. As each piston 13 is forced inwardly by means of pressure admitted to the upper portion of the corresponding cylinder through the port 22, water in the lower portion of said corresponding cylinder will escape through a port 23 by way of the corresponding two-way valve 21 to an exhaust 24. What may be called the abnormal movement of each piston 13 occurs when the corresponding two-way valve 21 is manually turned to the position as shown at the left in Fig. 1 so that connection exists between the corresponding port 22 and exhaust port 24 and between the corresponding pipe connection 19 and port 23 to permit the escape of water from the upper portion of the corresponding cylinder and direct water under pressure from said corresponding pipe connection 19 to said port 23 by which means the corresponding piston 12 is forced outwardly to permit refilling of the corresponding pocket with wood. This abnormal movement, being substantially unopposed, is relatively rapid and demands an increased amount of water.

Similar abnormal movement, although of less magnitude, occurs when a pocket has been refilled and the corresponding two-way valve 21 is then turned to the position shown at the right in Fig. 1, so as to move the corresponding piston 13 inwardly until the corresponding foot 15 again engages the blocks of wood.

When the blocks in a pocket are completely ground and the pocket is pulled off for refilling with wood blocks, the normal friction load of a grinder is resultantly lessened, and the valve mechanisms hereinbefore mentioned, for controlling flow of water into the first pipe connections 17 from the source of water under pressure, are adapted to function to increase pressure of fluid in said first pipe connections with the least reduction in friction load and decrease pressure of fluid in the first pipe connections with the least increase in friction load.

As now employed in the pulp grinding industry, supply pipes, equivalent to the first pipe connections 17, are directly connected to passes, equivalent to the second pipe connections 19, leading to cylinders such as 12. As is well known, there is friction loss when water flows through supply pipes, such as 17, and passes, such as 19, proportional to the square of the velocity of flow, and pressure differential between the source and outlet sides of the piping system becomes enlarged with increased flow and reduced with decreased flow. Hence, as now employed there is considerable variation in pressure in cylinders such as 12, the pressure decreasing with increased flow. Each of the valve apparatuses 18, interposed between the first pipe connections 17 and the second pipe connections 19, incorporates instrumentalities adapted to render the valve apparatus capable of creating reduced differential in pressure between its source and outlet sides in response to increased flow of water through said valve apparatus and enlarged differential in pressure between its source and outlet sides in response to decreased flow of water through the valve apparatus, thus to be capable of maintaining a substantially constant differential in pressure between the source and outlet sides of said valve apparatus and pressure of water at the outlet side of the valve apparatus which is substantially constant. Stated otherwise, the valve apparatus of the invention is adapted to function to cause pressure of water in the second pipe connection 19 to be increased in response to increase in the amount of flow of water through said valve apparatus, and vice versa. More explicitly, the new and improved valve apparatus incorporates a construction and arrangement, including a compound action differential pressure valve adapted to be actuated in part by the force produced by changes in flow to provide a valve opening through said compound action differential pressure valve which increases in size with increase in flow through said valve apparatus, whereby capacity for flow through the valve apparatus can be made sufficiently great, or greater than necessary, to accommodate increased flow thus to cause differential in pressure between the source and outlet sides of said valve apparatus to be reduced in response to increased flow.

Each valve apparatus 18 is constituted as a casing enclosing and supporting operative elements of said valve apparatus. In the disclosure as made, said casing consists of a pair of oppositely disposed, hollow sections, denoted 25 and 26, respectively, connected to each other by headed and nutted bolts 27 in annular flanges, represented 28 and 29, respectively, integral with said hollow sections, and a diaphragm 30 extending across the casing in spaced relation to the hollow sections has its peripheral portion situated in and clamped in fluid-tight fashion between said annular flanges. As disclosed, the annular flanges 28 and 29 are in parallel relation, and the headed and nutted bolts 27 which pass through said annular flanges also pass through the diaphragm 30. Said diaphragm provides, together with the hollow sections 25 and 26, first and second chambers, indicated 36 and 37, respectively, at the opposite sides of the diaphragm.

In the instance of each valve apparatus, the first pipe connection 17 is fitted within a threaded opening 31 through a portion of the hollow section 25 in spaced relation to and at a side of the diaphragm 30 to be open to the chamber 36, and the second pipe connection 19 is fitted within a threaded opening 32 through a portion of the hollow section 26 in spaced relation to said diaphragm and in alinement with the central portion of the diaphragm in direction longitudinally of the casing of the valve apparatus.

A nozzle 33, suitably and conveniently secured, as at 34, to the central portion of the diaphragm 30, provides a passageway 35 for flow of liquid or water from the chamber 36 to the chamber 37, and said passageway 35 is bounded by a valve seat 38 which faces toward said chamber 36 and tapers toward said chamber 37. While the valve seat 38 need not be tapered, a valve seat tapered to accomplish gradual acceleration of flow of liquid or water through the nozzle 33 desirably can be employed.

A plug type valve element 39, situated within the chamber 36 and rigid with a valve stem 40, is for controlling and regulating travel of liquid or water through the passageway 35. The valve stem 40, valve element 39, valve seat 38 and threaded opening 32 are all in alinement and disposed centrally of the valve casing along its longitudinal axis, and said valve stem passes outwardly of the hollow section 25 through a stuffing gland 41. The outer end portion of the valve stem 40 has an external thread 42 engaged with an internal thread of a cap member 43 upon said hollow section 25, and a manipulating piece 44 on the outer end of said valve stem is for accomplishing its rotatable adjustment thus to accomplish adjustment of the plug type valve element 39 in direction toward and away from the valve seat 38.

A tubular connection 45, suitably and conveniently rigidly supported in the hollow section 26 in alined relation with the valve stem 40, valve element 39, valve seat 38 and threaded opening 32, includes an inner end 46 in adjacent, spaced relation to the nozzle 33 which opens to the chamber 37 through a throat gap 47 between said tubular connection and nozzle and an outer end 48 which is contiguous with the second pipe connection 19.

The tubular connection 45 shuts off the outer end of the chamber 37 from the second pipe connection 19 and provides an outlet passageway for flow of liquid or water from the chamber 36 by way of the inner end of said chamber 37 to said second pipe connection 19. A function of said tubular connection is to isolate the outer marginal portion of the outlet side of the diaphragm 30, or the chamber 37 side of said diaphragm, from pressure of liquid or water in the outlet passageway which the tubular connection provides, and also in said second pipe connection 19, save by way of the throat gap 47. In the disclosure as made, the tubular connection 45 is of tapering configuration in outward direction to the end that it will function in the well known manner of a venturi to be helpful in converting velocity head at the general location of the nozzle 33 and the throat gap 47 into pressure head in the second pipe connection 19.

A compression coil spring 49, situated within the chamber 37 in surrounding relation to the tubular connection 45 and having one of its ends seated against an annular flange on said tubular connection and its other end pressingly engaged against parts rigid with an intermediate portion of the diaphragm 30, is for urging said diaphragm and the valve seat 38 in direction toward the valve element 39, and a stop 50, supported by the hollow section 25 and situated within the chamber 36, is for limiting the extent of possible movement of said valve seat 38 in direction toward said valve element 39.

During practical operation of the valve apparatus, the diaphragm 30, the nozzle 33 and the valve seat 38 provided by said nozzle will be acted upon both by static pressure differential between the source and outlet sides of the passageway 35 and by changes in flow of liquid or water through said passageway as expressed by the velocity head. The source side of the diaphragm and nozzle is acted upon by the static pressure on the source side over the whole of the area of said diaphragm and nozzle. The outlet side of the diaphragm and nozzle is acted upon by the static pressure on the outlet side minus the velocity head of liquid or water flowing through the passageway 35, and the static pressure on the outlet side of said diaphragm which is operative upon outer marginal portions of the diaphragm is that, and only that, permitted by the throat gap 47. Static pressure on the outlet side of the diaphragm and nozzle operative upon the outlet side of outer marginal portions of the diaphragm is excluded except by way of said throat gap 47.

Inasmuch as the velocity head varies as the square of the velocity, it is readily possible to obtain increased valve opening, between the valve seat 38 and the valve element 39, of relatively great capacity in response to increased flow of comparatively small value, and with increased flow through the passageway 35 the pressure at the location of the outlet side of said passageway becomes depressed. At the same time, the throat gap 47 becomes diminished in size so that the action of static pressure on the outlet side of the outer marginal portion of the diaphragm becomes reduced with increased flow. The throat gap 47 becomes narrowed with increase in flow and widened with decrease in flow past the diaphragm. The construction and arrangement are such that with reduction in pressure on the outlet side of the diaphragm there is increased valve opening permitting increased flow adapted to maintain differential in pressure at the source and outlet sides of said diaphragm substantially constant.

The valve element 39 can be manually moved toward and away from the valve seat 38 to the accomplishment of adjustment for a desired pressure differential between the source and outlet sides of the valve apparatus, or adjustment for a desired pressure differential can be accomplished by manual adjustment of the tension under which the compression coil spring 49 is confined.

At maximum discharge the size of the passageway 35 of course will predetermine the velocity head, and said passageway obviously can be sufficiently small to cause increase in velocity head to be larger than necessary even to compensate for friction loss, thus to obtain a lower differential pressure at higher discharge than at lower discharge in any instance when this may be desirable.

The magnitude of the throat gap 47 changes in operation directly with change in flow and also changes as the differential setting of the valve apparatus is adjusted. The magnitude of said throat gap can vary considerably, at least up to half the diameter of the nozzle passageway or orifice 35 and even more under certain conditions of use of the valve apparatus.

An essential feature of the valve apparatus is its compound action accomplished by static pressure differential and by changes in flow. This is not affected by making the tubular connection 45 tapered. The purpose of utilizing an expanding tubular connection is to convert the maximum possible amount of velocity head into pressure head and thus reduce the overall loss in head.

By way of example, the nozzle orifice area may advantageously be about one tenth of the pipe area for pipe velocities of 3 or 4 feet per second and provide a velocity at the throat gap about ten times the velocity in the pipe and a velocity head at said throat gap of about 100 times the velocity head in the pipe. The large velocity head actuating force which is obtainable will, designedly, open up the valve in response to increased flow to extent sufficient to compensate for the increased flow.

The recovery of velocity head in an expanding tubular connection such as 45 can reduce the loss through the valve to practically zero even though the passageway or orifice 35 and throat gap 47 areas are only a fraction of the size of the pipe connection areas.

The compound action differential pressure valve which the invention presents possesses advantageous features not possessed by pilot operated mechanisms intended for the same general purpose. Its operation is extremely fast and it is free from hunting because over-travel is impossible. By being able to secure large valve travel it is possible to employ relatively small diameter valves. Direct actuation permits the use of large valve travel without loss of speed. Wide space between valve and seat insures complete freedom from chattering. Direct actuation greatly simplifies construction and reduces cost.

When in pulp mill operation it is desired to reduce the differential pressure to zero, the valve element 39 is raised a large amount so as to provide wide valve opening. The first retraction of said valve element causes the compression coil spring 49 to force the valve seat upward. This continues until the nozzle 33 engages the stop 50. Meanwhile, the differential pressure setting of the valve has grown smaller and smaller. After said nozzle engages said stop further retraction of the valve element 39 opens the valve wide and reduces the pressure drop to practically zero. To reset the valve apparatus to obtain the desired differential, all that is necessary is to adjust said valve element 39 the requisite distance toward the valve seat 38.

What is claimed is:

1. A valve apparatus comprising a casing, a flexible diaphragm in said casing supporting a member having a valve seat, said diaphragm with valve seat member and said casing together providing first and second chambers at opposite sides of the diaphragm, an inlet for liquid under pressure to the first chamber, a valve element in said first chamber, said valve seat member being movable as a unit with said diaphragm toward and away from said valve element, resilient means urging said valve seat member toward said valve element, and a tubular member providing an outlet passageway leading toward a location of use for said liquid having an inner end portion thereof projecting into said second chamber and an inner end thereof situated in spaced, adjacent relation to said valve seat member and providing therewith a continuously open throat gap surrounded at a location rearwardly of the inner end of the tubular member by an outer marginal portion of said diaphragm and at a location forwardly of said inner end of the tubular member by an open area of said second chamber isolated from pressure of liquid in said outlet passageway save by said throat gap, said casing and tubular member cooperating to prevent passage of liquid out of the casing save by way of said outlet passageway.

2. A valve apparatus comprising a casing, a flexible diaphragm in said casing supporting a member having a valve seat, said diaphragm with valve seat member and said casing together providing first and second chambers at opposite sides of the diaphragm, an inlet for liquid under pressure to the first chamber, a valve element in said first chamber, said valve seat member being movable as a unit with said diaphragm toward and away from said valve element, and there being an outlet orifice from the member of size not greater than the size of the outlet side of said valve seat, resilient means urging said valve seat member toward said valve element, and a tubular member providing an outlet passageway leading toward a location of use for said liquid having an inner end portion thereof projecting into said second chamber and an inner end thereof situated in spaced, adjacent relation to said valve seat member and providing therewith a continuously open throat gap surrounded at a location rearwardly of the inner end of said tubular member by an outer marginal portion of said diaphragm and at a location forwardly of said inner end of the tubular member by an open area of said second chamber isolated from pressure of liquid in said outlet passageway save by said throat gap, said valve seat member being adapted to be moved away from said valve element and toward said tubular member against force of said resilient means to cause an opening to said valve seat to be widened and said throat gap to be narrowed in response to increased flow through the valve apparatus producing reduced throat gap pressure, and said resilient means being adapted to move said valve seat member away from said tubular member and toward said valve element to cause the throat gap to be widened and said opening to be narrowed in response to decreased flow through said valve apparatus producing increased throat gap pressure, said casing and tubular member cooperating to prevent passage of liquid out of the casing save by way of said outlet passageway.

3. The combination as specified in claim 1 wherein the outlet passageway provided by the tubular member is of expanding configuration.

4. The combination as specified in claim 2 wherein the outlet passageway provided by the tubular member is of expanding configuration.

ADOLPH F. MEYER.

REFERENCES CITED

The following references are of record in the file of this patent:

UNITED STATES PATENTS

| Number | Name | Date |
|---|---|---|
| 28,722 | Whitaker | June 12, 1860 |
| 1,685,866 | Raymond | Oct. 2, 1928 |
| 2,006,319 | Hueber | June 25, 1935 |
| 2,398,252 | Rockwell | Apr. 9, 1946 |

FOREIGN PATENTS

| Number | Country | Date |
|---|---|---|
| 67,598 | Norway | Sept. 30, 1941 |
| 40,557 | Sweden | Apr. 26, 1916 |
| 81,738 | Sweden | of 1934 |